US010009232B2

(12) United States Patent
Duncan et al.

(10) Patent No.: US 10,009,232 B2
(45) Date of Patent: Jun. 26, 2018

(54) METHOD AND CONTROL SYSTEM PROVIDING AN INTERACTIVE INTERFACE FOR DEVICE-LEVEL MONITORING AND SERVICING OF DISTRIBUTED, LARGE-SCALE INFORMATION HANDLING SYSTEM (LIHS)

(71) Applicant: DELL PRODUCTS, L.P., Round Rock, TX (US)

(72) Inventors: Tyler B. Duncan, Austin, TX (US); Michael M. Toulouse, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 283 days.

(21) Appl. No.: 14/748,199

(22) Filed: Jun. 23, 2015

(65) Prior Publication Data

US 2016/0380844 A1    Dec. 29, 2016

(51) Int. Cl.
| | |
|---|---|
| *G06F 3/0482* | (2013.01) |
| *G06F 3/0484* | (2013.01) |
| *H04L 12/24* | (2006.01) |
| *H04L 12/26* | (2006.01) |
| *G06F 11/30* | (2006.01) |

(52) U.S. Cl.
CPC ............ *H04L 41/22* (2013.01); *G06F 3/0482* (2013.01); *G06F 3/0484* (2013.01); *G06F 3/04842* (2013.01); *G06F 11/30* (2013.01); *H04L 41/12* (2013.01); *H04L 43/0817* (2013.01)

(58) Field of Classification Search
CPC ....... H04L 43/0817; H04L 41/22; H04L 4/30; G06F 3/0484; G06F 3/04842; G06F 11/30; G06F 3/0482
See application file for complete search history.

(56) References Cited

U.S. PATENT DOCUMENTS

| | | | |
|---|---|---|---|
| 4,701,752 A | * | 10/1987 | Wang ........................ G06T 3/60 |
| | | | 345/619 |
| 5,276,789 A | | 1/1994 | Besaw et al. |
| 6,285,967 B1 | | 9/2001 | Rajan et al. |
| 6,760,908 B2 | | 7/2004 | Ren |

(Continued)

*Primary Examiner* — Aaron Lowenberger
(74) *Attorney, Agent, or Firm* — Isidore PLLC

(57) ABSTRACT

A controller of a large-scale information handling system (LIHS) includes a memory containing visual representations of architecture and sub-architecture associated with respective data center (DC) configurations. An interactive component-level visual monitoring and control (ICVMC) system includes a processor in communication with the component level monitors and the memory and includes an ICVMC module executing on the processor to receive identification information from one or more component-level monitors of a DC. The DC includes-functional components operationally configured and interconnected in a core architecture in a first DC configuration and monitored respectively by the one or more component-level monitors. The ICVMC module determines the first DC configuration and associated core architecture based on the received identification information. The ICVMC module generates graphical user interfaces (GUIs) for the DC based on the determined first DC configuration and the visual representation of architecture and sub-architectures associated with the first DC configuration.

17 Claims, 14 Drawing Sheets

(56) References Cited

U.S. PATENT DOCUMENTS

| | | |
|---|---|---|
| 7,383,454 B2 | 6/2008 | Loffink et al. |
| 7,426,571 B2 | 9/2008 | Chadalavada |
| 7,603,446 B2 | 10/2009 | Brisse |
| 7,852,627 B2 | 12/2010 | Schmitt et al. |
| 7,961,463 B2 | 6/2011 | Belady et al. |
| 8,046,896 B2 | 11/2011 | Schmitt et al. |
| 8,251,785 B2 | 8/2012 | Schmitt et al. |
| 8,264,840 B2 | 9/2012 | Bergthold et al. |
| 8,446,710 B2 | 5/2013 | Schmitt et al. |
| 8,468,513 B2 | 6/2013 | Zorn |
| 8,488,960 B2 | 7/2013 | DeCusatis et al. |
| 8,533,601 B2 | 9/2013 | LaForest |
| 8,566,066 B2 * | 10/2013 | Thompson .............. G06F 17/50 345/420 |
| 8,726,002 B2 | 5/2014 | Perusse, Jr. |
| 8,733,812 B2 | 5/2014 | Slessman |
| 8,793,587 B2 | 6/2014 | Sayers |
| 8,935,701 B2 | 1/2015 | Bakman |
| 9,100,283 B2 | 8/2015 | Kraus et al. |
| 2002/0158898 A1 | 10/2002 | Hsieh et al. |
| 2003/0140128 A1 | 7/2003 | Cox et al. |
| 2006/0082263 A1 | 4/2006 | Rimler et al. |
| 2006/0218510 A1 | 9/2006 | Ward |
| 2009/0089567 A1 | 4/2009 | Boland, IV et al. |
| 2012/0200206 A1 | 8/2012 | Schmitt et al. |
| 2012/0200992 A1 | 8/2012 | Schmitt et al. |
| 2012/0253710 A1 | 10/2012 | Lehmann et al. |
| 2013/0111275 A1 | 5/2013 | Ganesan et al. |
| 2013/0173768 A1 | 7/2013 | Kundu et al. |
| 2013/0238795 A1 | 9/2013 | Geffin et al. |
| 2014/0033201 A1 | 1/2014 | Dawkins et al. |
| 2014/0122931 A1 | 5/2014 | Devale et al. |
| 2014/0181292 A1 | 6/2014 | Venkataswami et al. |
| 2014/0208214 A1 * | 7/2014 | Stern ....................... H04L 41/22 715/734 |
| 2014/0297569 A1 | 10/2014 | Clark et al. |
| 2014/0310816 A1 | 10/2014 | Vrhel et al. |
| 2015/0020050 A1 | 1/2015 | Dain |
| 2015/0169353 A1 | 6/2015 | Colla et al. |

\* cited by examiner

METHOD AND CONTROL SYSTEM PROVIDING AN INTERACTIVE INTERFACE FOR DEVICE-LEVEL MONITORING AND SERVICING OF DISTRIBUTED, LARGE-SCALE INFORMATION HANDLING SYSTEM (LIHS)

RELATED APPLICATIONS

The present application is related to the following copending U.S. patent application Ser. No. 14/748,189, filed Jun. 23, 2015; and Ser. No. 14/748,201, filed Jun. 23, 2015, with relevant content of each related application being incorporated herein by reference.

BACKGROUND

1. Technical Field

The present disclosure relates in general to enterprise-level monitoring and diagnostic systems, and more particularly to graphical user interface (GUI) control of large-scale information handling systems (LIHS).

2. Description of the Related Art

As the value and use of information continue to increase, individuals and businesses seek additional ways to process and store information. One option available to users is information handling systems (IHSes). An IHS generally processes, compiles, stores, and/or communicates information or data for business, personal, or other purposes, thereby allowing users to take advantage of the value of the information. Because technology and information handling needs and requirements vary between different users or applications, IHSes may also vary regarding what information is handled, how the information is handled, how much information is processed, stored, or communicated, and how quickly and efficiently the information may be processed, stored, or communicated. The variations in IHSes allow for IHSes to be general or configured for a specific user or specific use such as financial transaction processing, airline reservations, enterprise data storage, or global communications. In addition, IHSes may include a variety of hardware and software components that may be configured to process, store, and communicate information and may include one or more computer systems, data storage systems, and networking systems.

Conventional modular data centers (MDCs) and server systems provide discrete monitoring and control systems that are configured for a standard configuration. When another MDC or server system is to be added to the standard configuration, a legacy system requires that a configuration profile of the new system be manually entered by a user, such as, by setting control registers and monitoring registers. The added information is typically extremely generic or superficial, relying largely or solely on a system specification as a source for general monitoring information.

BRIEF SUMMARY

In accordance with the teachings of the present disclosure, a large-scale information handling system (LIHS) includes a data center (DC) having functional components operationally configured and interconnected in a core architecture in a first DC configuration. The DC includes one or more component-level monitors that monitor respective functional components. A memory contains visual representations of architecture and sub-architecture associated with respective DC configurations. A processor is in communication with the component level monitors and the memory. An interactive component-level visual monitoring and control (ICVMC) system includes an ICVMC module executing on the processor to receive identification information from one or more component-level monitors of the DC. The ICVMC module determines the first DC configuration and associated core architecture based on the received identification information. The ICVMC module generates one or more graphical user interfaces (GUIs) for the DC, based on the determined first DC configuration and the visual representation of architecture and sub-architectures associated with the first DC configuration.

In accordance with embodiments of the present disclosure, a controller of a LIHS includes a memory containing visual representations of architecture and sub-architecture associated with respective DC configurations. A ICVMC system includes a processor in communication with the component level monitors and the memory and comprising an ICVMC module executing on the processor to receive identification information from one or more component-level monitors of a DC. The DC has functional components operationally configured and interconnected in a core architecture in a first DC configuration that are monitored respectively by the one or more component-level monitors. The ICVMC module determines the first DC configuration and associated core architecture based on the received identification information. The ICVMC module generates one or more GUIs for the DC based on the determined first DC configuration and the visual representation of architecture and sub-architectures associated with the first DC configuration.

According to illustrative embodiments of the present disclosure, a method of interactively and visually monitoring and controlling a LIHS is provided at a component level. In one or more embodiments, the method includes a controller receiving identification information from one or more component-level monitors of a DC that comprises functional components operationally configured and interconnected in a core architecture in a first DC configuration and monitored respectively by the one or more component-level monitors. The method includes the controller determining the first DC configuration and associated core architecture based on the received identification information. The method includes the controller generating one or more GUIs for the DC based on the determined first DC configuration and visual representation of architecture and sub-architectures associated with the first DC configuration selected from a plurality of visual representations of architecture and sub-architecture associated with respective DC configurations.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
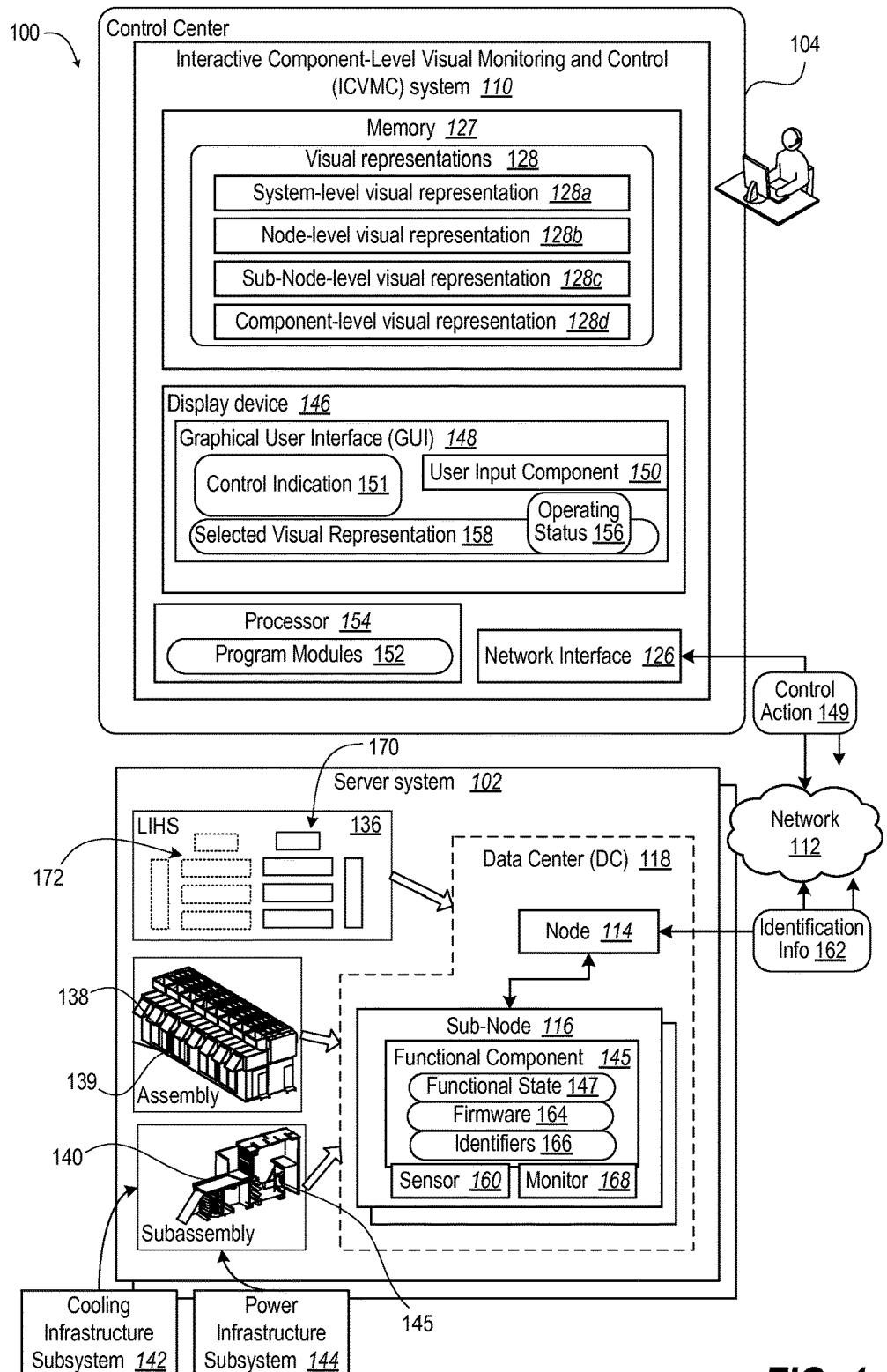
FIG. 1 illustrates a block diagram representation of an example information handling system (IHS) having an Interactive Component-Level Visual Monitoring and Control (ICVMC) System, according to one or more embodiments.

The present innovations provide an Interactive "Component-Level" Visual Monitoring and Control (ICVMC) Module/System for a server system, with particular application for a server system that is a large-scale IHS (LIHS). In an exemplary embodiment of LIHSes, ICVMC can provide monitoring and diagnostic services for a large-scale modular information handling system (LMIHS) that is a particular type of LIHS based on modular data centers (MDCs) that are networked and centrally managed. In one aspect, ICVMC maps a series of graphical user interfaces (GUIs) linked to different levels and sub-levels of a layout and configuration of hardware devices and firmware components of an information handling system (IHS) such an MDC or LMIHS. The top-level GUI provides a rendering of the general overview of an entire enterprise IHS. From this level, a user is able to drill down to various sub-levels of GUIs representing different parts of device topology. The user can drill down all the way to a device/component level via a series of interactive clicks, touch screen selections, and/or menu selections. Each GUI can present a visual image of physical components at that level or sub-level of the IHS to which the user has drilled down to.

In order to facilitate adding new MDCs or server systems to the IHS, a self-learning feature of the ICVMC allows for automated generation of the GUI-presented topology of a newly connected MDC or server to an existing IHS. In one or more embodiments, the ICVMC includes a base or shell that includes the core building blocks of the architecture. The newly-added MDC is designed with the component level monitors and an identifier (e.g., serial number and/or model number) that is passed to the ICVMC when the MDC is connected. Using this identifier, the ICVMC is able to select the core architecture of the MDC and then trigger the MDC to run a setup diagnostic that pulls a listing of each device present in the MDC and other data relevant to the monitoring and control of that device. With this information, the ICVMC generates a series of GUIs representative of the topology of the new MDC and adds the sequence of GUIs to its knowledge base or detected MDCs. The top level GUI and/or menu item is then updated to include an identifier of the newly added MDC along with the legacy devices in the overall system. Automated learning of each added device can include identifying symmetries in topography between two different systems that are mirror images of each other. When a newly added MDC/server is a mirror-image (i.e., left versus right assembly) of an existing MDC/server whose topography is known and represented by a series of GUIs, the ICVMC can copy the series of GUIs and implement an automated mirror imaging of each GUI in the series of GUIs in order to properly identify the component locations. The mirror-images of the GUIs are stored in a database as the functioning GUIs of the new MDC/server, substantially reducing the development time for generating new GUIs for that MDC/server.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100. In at least one embodiment, because of the relatively large architectural scale of an enterprise IHS of multiple standalone MDCs and MDCs arranged in a high availability (HA) arrangement as a large-scale information handling system (LIHS) or simply an IHS. Within the general context of IHSs, an information handling system (IHS) 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The IHS may include memory, one or more processing resources such as a central processing unit (CPU) or hardware or software control logic. Additional components or the IHS may include one or more storage devices, one or more communications ports for communicating with external devices as well as various input and output (I/O) devices, such as a keyboard, a mouse, and a video display. The IHS may also include one or more buses operable to transmit communication between the various hardware components. It is appreciated that the IHS described within the present disclosure is a LIHS, with servers acting as the individual processing units.

In one or more embodiments, the IHS 100 can include a server system 102 that is to be interactively monitored at a component level from a control center 104, which can be co-located with or remote to the server system 102. The server system 102 can be one or more rack-mounted servers, a data center (DC) that contains rack-mounted servers, one or more modular data centers (MDCs), or one or more LIHSes. For clarity, an Interactive Component-Level Visual Monitoring and Control (ICVMC) system 110 at the control center 104 communicates over a network 112 with a node 114 and in turn with one or more sub-nodes 116 of a DC 118. The ICVMC system 110 includes a network interface 126 enabling communication with the network 112 over which the node 114 is connected. In one or more embodiments, the network interface 126 can communicate with a local network. In one or more embodiments, the network interface 126 can communicate over a wide area network to geographically dispersed portions of a DC 118.

The ICVMC system 110 includes a memory 127 containing visual representations 128 of the plurality of nodes with a plurality of different levels of visual representations 128, including a system level, node levels, sub-node levels, and component levels. The system level, node levels, sub-node levels, and component levels 128a-128d can be physical representations. For example, a system level visual representation 128a can be an external rendering of three-dimensional computer aided design (CAD) model or photograph of an LIHS 136 that includes more than one MDC 138. A node level visual representation 128b can be an isometric rendering of a CAD model or photograph of an assembly 139, such as one MDC 138. A sub-node level visual representation 128c can be an isometric rendering of a CAD model or photograph of a subassembly 140 of one MDC 138, such as a cooling or power infrastructure subsystem 142, 144. Node level visual representations 128b and/or sub-node level visual representations 128c can include an isometric rendering of a CAD model or photograph of one or more functional components 145. Additional hierarchical representations can be included down to sub sub-assemblies, etc. For clarity, some levels of visual representation can include or entail entirely a functional representation such as for sensor and electrical power that do not lend themselves readily to an isometric view.

The ICVMC system 110 can include a display device 146 that provides a graphical user interface (GUI) 148 on which each of the different levels of visual representations 128a-128d can be presented. The ICVMC system 110 can include at least one user input component 150 that is capable of manipulating and/or interfacing with one or more items on the GUI 148.

The ICVMC system 110 can execute ICVMC program modules 152 on a processor 154 in communication with the display device 146, the memory 127, and the network interface 126 to configure the ICVMC system 110 to display on the display device 146 the visual representation 128 of one of the plurality of different system, node subnode levels (e.g., LIHS 136, MDC 138, cooling or power infrastructure subsystem 142, 144) of the IHS 100 based on a current level identified/selected on the GUI 148. The ICVMC system 110 can receive, via the network interface 126, a current functional state 147 of functional components 145 at each component level that is being monitored by one or more sensors 160. The ICVMC system 110 can determine an operating status 156 of the at least one functional component 145 from the current functional state received. The ICVMC system 110 can display on the display device 146 the operating status 156 of the at least one functional component 145 on a selected visual representation 158 at each level of the plurality of different levels when the operating status 156 includes a problem state from among a failed operating state, a malfunctioning state, and/or a check and/or repair (C/R) operating state. For example, a failed operating state can indicate a functional component 145 that is entirely non-functional, i.e., has stopped working. A malfunctioning operating state can indicate a functional component 145 that intermittently is nonfunctional. A C/R operating state can be a functional component 145 that is performing its function satisfactorily but is sensed as having an increased likelihood of failure. For example, the service count is high, a sensor reading is out of a normal operating range, such as for power consumed or temperature, etc. The ICVMC system 110 can, in response to receiving a user input selecting a specific component level among the one or more levels that is different from a current level being displayed, modify the GUI 148 to display the visual representation 128a-128d of the specific component level and identifying any components having the problem state. In one or more embodiments, the ICVMC system 110 can determine an opportunity for performing a control action 149 over the network 112 to identical functional components 145 on different nodes 114. The ICVMC system 110 displays a control indication 151 for manipulation/selection by the user input component 150 to trigger the control action 149.

The control action 149 can be associated with building a GUI 148 for a particular DC 118 that is communicated with over a network 112 that is local. The control action 149 can be associated with building a GUI 148 for a particular DC that is a network-connected data center (nDC) that is over a network 112 that is geographically dispersed. In one or more embodiments, the control action 149 prompts the DC 118 to send identification information 162 over the network 112 to the ICVMC system 110. For example, the functional components 145 can each include firmware 164 of a specific configuration and be associated with identifiers 166 such as serial number, model number, manufacturer, etc, which are tracked by the identification information 162. Component-level monitors 168 can maintain and communicate the identification information 162 for the DC 118.

The ICVMC system 110 can have pre-existing configuration and visual representation information 170 for half of an LIHS 136. For example, the LIHS 136 can be laid out to grow as requirements increase over time with a right or left half being initially implemented. The identification information 162 can be associated with mirror-image configuration and visual representation information 172 to the pre-existing pre-existing configuration and visual representation information 170.

Figure 2:
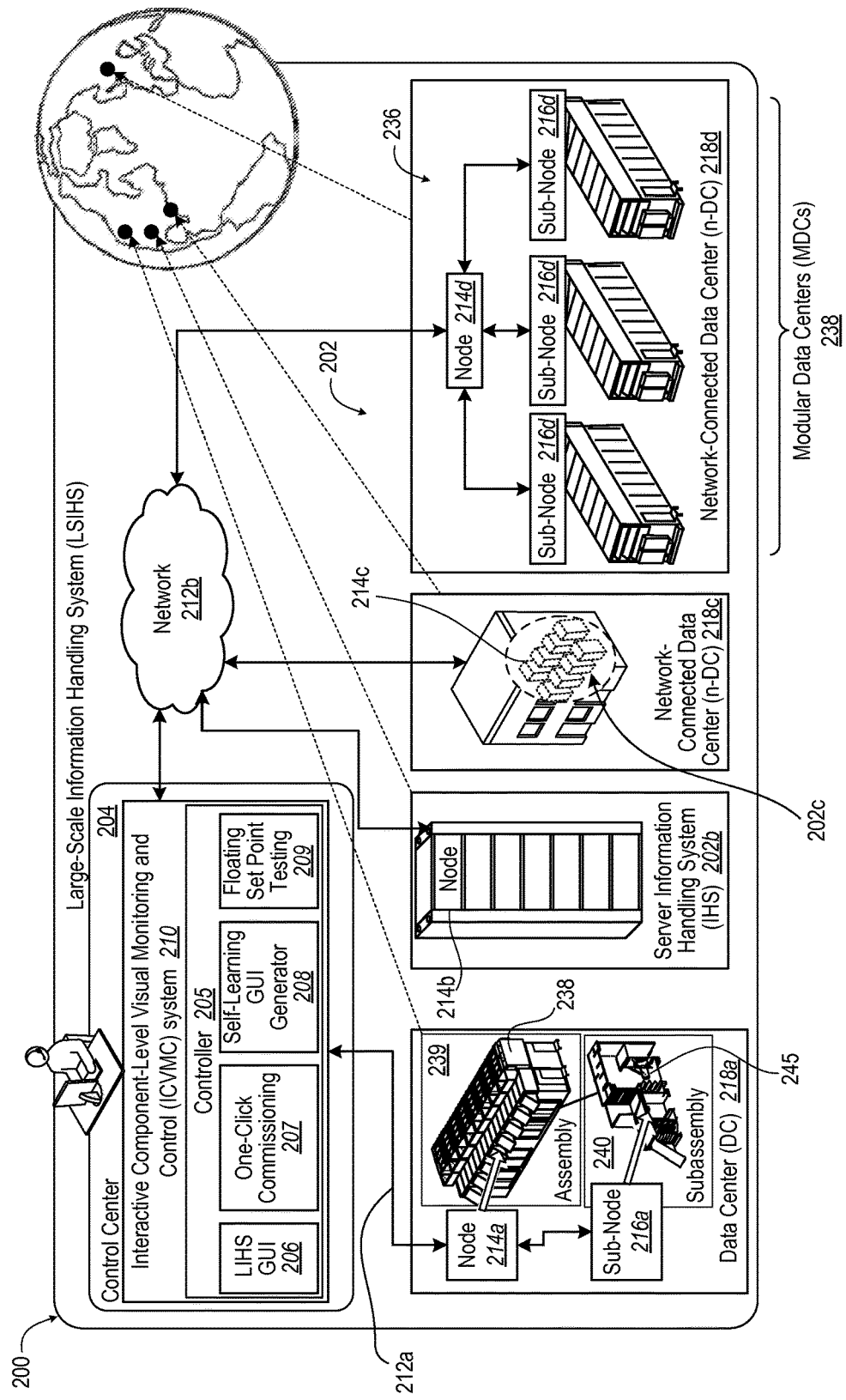
FIG. 2 illustrates an example Large-Scale Information Handling System (LIHS) having server systems that are monitored and controlled by a control center by using an ICVMC system, according to one or more embodiments.

FIG. 2 illustrates an example LIHS 200 having server systems 202 that are monitored and controlled by a control center 204 by using an ICVMC system 210 having a controller 205 that executes program modules. In an exemplary embodiment, the controller 205 executes an LIHS GUI program module 206, a one-click commissioning program module 207, a self-learning GUI generator program module 208 and a floating set point testing program module 209. In one or more embodiments, the ICVMC system 210 manages a node 214a and sub-nodes 216a via a local network 212a of a local DC 218a. For example, the local DC 218a can be an MDC 238 that includes assemblies 239 and subassemblies 240 containing functional components 245. In one or more embodiments, the ICVMC system 210 manages a node 214b of one or rack-mounted server system 202b over a geographically distributed network 212b. In one or more embodiments, the ICVMC system 210 manages a node 214c of a network-connected data center (nDC) 218c having rack-mounted server systems 202c over the geographically distributed network 212b. In one or more embodiments, the ICVMC system 210 manages, over the geographically distributed network 212b, a node 214d of a network-connected data center (nDC) 218d that includes an LIHS 236 having sub-nodes 216d of MDCs 238.

In an exemplary embodiment, the ICVMC system 210 can perform one or more interactive control functions by monitoring systems to detect opportunities for intervention. Certain functions are automated and others facilitate control by a human operator. For example, LIHS GUI program module 206 can intuitively utilize CAD models that have problem areas illuminated with semi-transparent overlays. The operator can select areas, such as by touching a touch screen, to drill down in the GUI to a next deeper level view. The GUI can be provisioned with and/or identify all functional components and sensors as well as visually indicate their geographic or relative physical location on CAD models or other physical renderings. In addition to drilling down to component-level visual information, the ICVMC system 210 can facilitate as a unified tool moving to upper levels to quickly visualize an operational layout and operating status of a data center or LIHS. The ICVMC system 210 can push control code to functional components for correcting a malfunction or to perform diagnostic testing.

The one-click commissioning program module 207 of the ICVMC system 210 can provide a single button to push updates or customizations to global data centers. The one-click commissioning program module 207 can provide an automated procedure to test all devices on a module and report the results of each test. The self-learning GUI generator program module 208 of the ICVMC system 210 can change between left and right modules in a setup of an MDC or an LIHS. The self-learning GUI generator program module 208 of the ICVMC system 210 can auto-detect device configuration.

The floating set point testing program module 209 of the ICVMC system 210 can have common control code while utilizing a separate configuration file to set customer/site specific set points for customized operation. The floating set point testing program module 209 can push control code to functional components to perform diagnostic testing and can retrieve diagnostic information, such as programmable logic controller (PLC) logs. The ICVMC system 210 can also perform testing of a communication system across the LIHS 200 by decoupling control code from communication outputs. For example, a single button control can set unique values to all analog registers to prove true one-to-one correspondence. For another example, automatic cycling through all registers can be performed at a user-defined speed to test that all binary registers are received by third-party software. The floating set point testing program module 209 can use persistent variables for all set points, which are modifiable by commissioning and administer user levels. The floating set point testing program module 209 can return all set points to factory defaults after commissioning user level is completed. The floating set point testing program module 209 can enable floating set points to optimize power while controlling temperature and humidity for specific portions of the LIHS.

Figure 3:
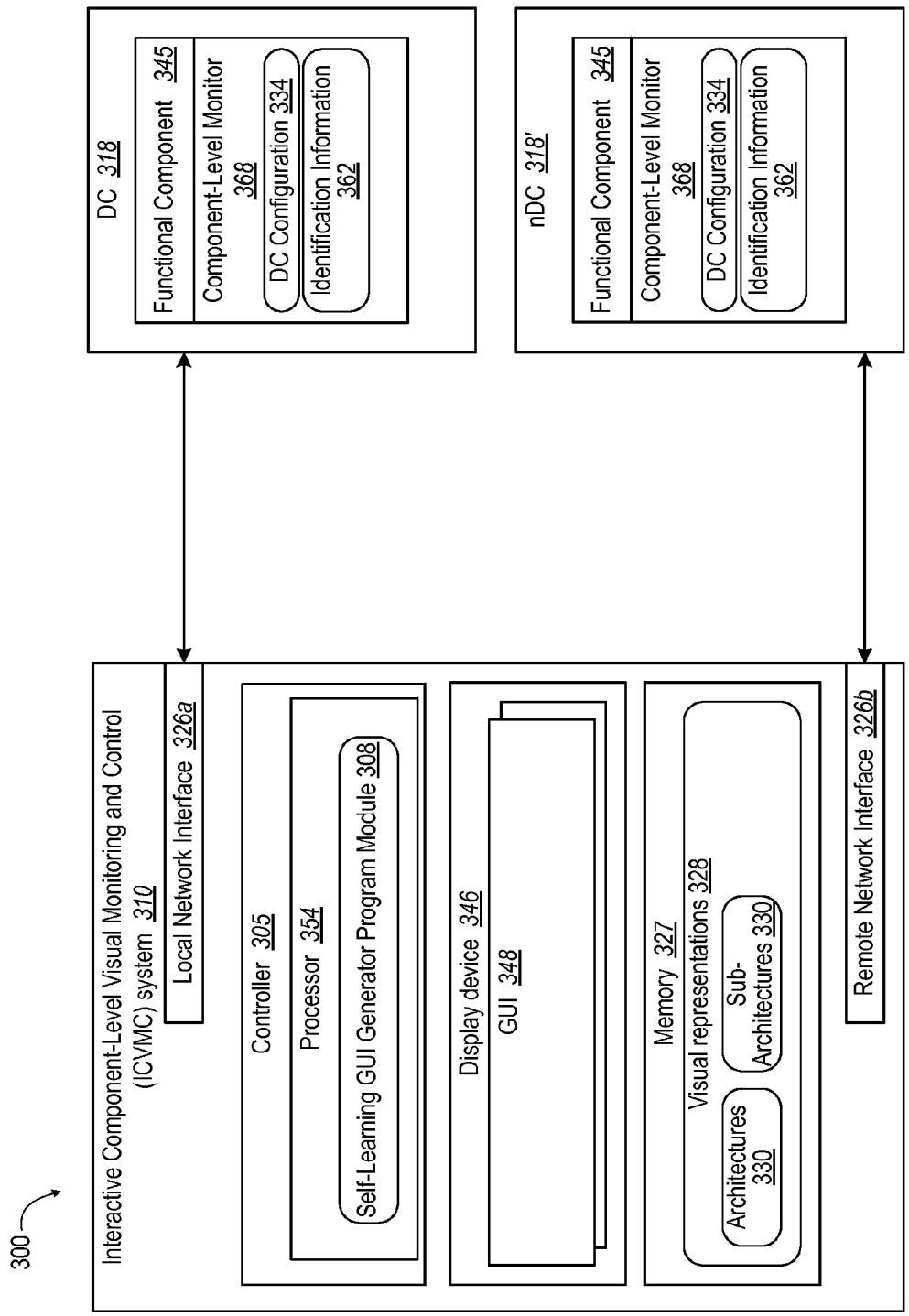
FIG. 3 illustrates an LIHS in which a controller of the ICVMC system executes a self-learning Graphical User Interface (GUI) generator program module to perform a control action to identical functional components of different nodes of the LIHS, according to one or more embodiments.

FIG. 3 illustrates an LIHS 300 in which a controller 305 of an ICVMC system 310 executes a self-learning GUI generator program module 308 to generate GUIs 348 of the LIHS 300 by self-learning. The ICVMC system 310 includes a memory 327 containing visual representations 328 of architecture 330 and sub-architecture 332 associated with respective DC configurations 334. The ICVMC system 310 includes a processor 354 that is in communication via a local network interface 326a with component-level monitors 368 of each DC 318. The ICVMC system 310 is also in communication with the memory 327. The self-learning GUI generator program module 308 executes on the processor 354 to receive identification information 362 from the component-level monitors 368 of a DC 318. The identification information 362 is associated with functional components 345 operationally configured and interconnected in a core architecture 374 in a first DC configuration 376. The self-learning GUI generator program module 308 determines the first DC configuration 376 and associated core architecture 374 based on the received identification information 362. The self-learning GUI generator program module 308 generates one or more GUIs 348 for the DC 318 based on the determined first DC configuration 376 and the visual representation 328 of architecture 330 and sub-architectures 332 associated with the first DC configuration 376. The visual representations 328 can include three-dimensional CAD models that are rendered on a display device 346 as part of the GUI 348.

In one or more embodiments, the ICVMC system 310 controls more than one DC 318. For clarity, the ICVMC system 310 detects over a remote network interface 326b to a network-connected data center (nDC) 318'. In in response to detection of the nDC 318', the controller 305 triggers the nDC 318' to run a setup diagnostic procedure 378 to retrieve, compile and send a listing 380 of specific components that are present in the nDC 318'. The ICVMC system 310 increases automation of GUI generation by enabling separating core architectures that are relatively few in number from configurations of functional components 345 that can create unique combinations for each DC 318 or portion of a DC 318. Updating the ICVMC system 310 is therefore simplified.

Figure 4:
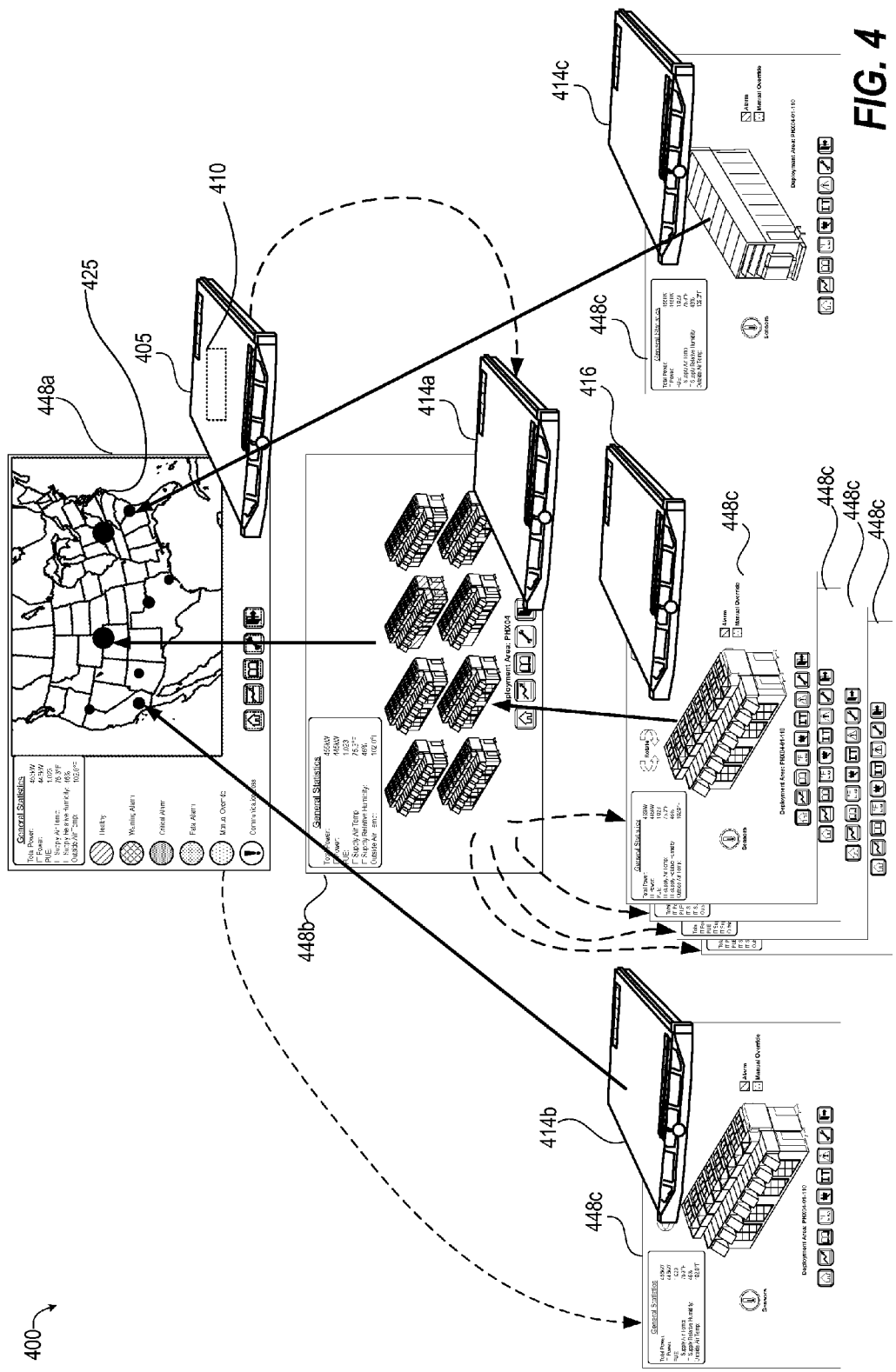
FIG. 4 illustrates a multi-tiered LIHS with an ICVMC system including a controller to monitor and control nodes and a sub-node using a multi-tier GUI, according to one or more embodiments.

FIG. 4 illustrates an LIHS 400 that is multi-tier with an ICVMC system 410, which includes a controller 405 to monitor and control nodes 414a-414c and a sub-node 416 using a multi-tier GUI 448. The GUIs can be multi-tier by presenting the LIHS 400 in different levels of detail and granularity. A fault at a particular geographic location can be presented in an upper level view. A user can drill down through tiers or levels in a hierarchy of GUIs to follow the fault to one or more contributing functional components or subsystem of functional components. In one or more embodiments, an upper level GUI 448a can depict a geographical view 425 with locations and operating status of server systems annotated. A user input to a location can link to a large-scale system level GUI 448b, which can include a data center layout of multiple MDCs. A user input to a particular MDC on the large-scale system level GUI 448b can link to one of more than one system-level GUIs 448c. Other locations on the upper-level GUI 448a can link directly to a system-level GUI 448c for smaller data centers. The levels can also be referred to as nodes and sub-nodes. Additional levels of GUIs can be provided in other implementations, and the presentation herein of a specific subset of GUIs is not intended to limit or be viewed as a limitation on the actual numbers of levels utilized and/or available to be accessed and displayed.

Figure 5:
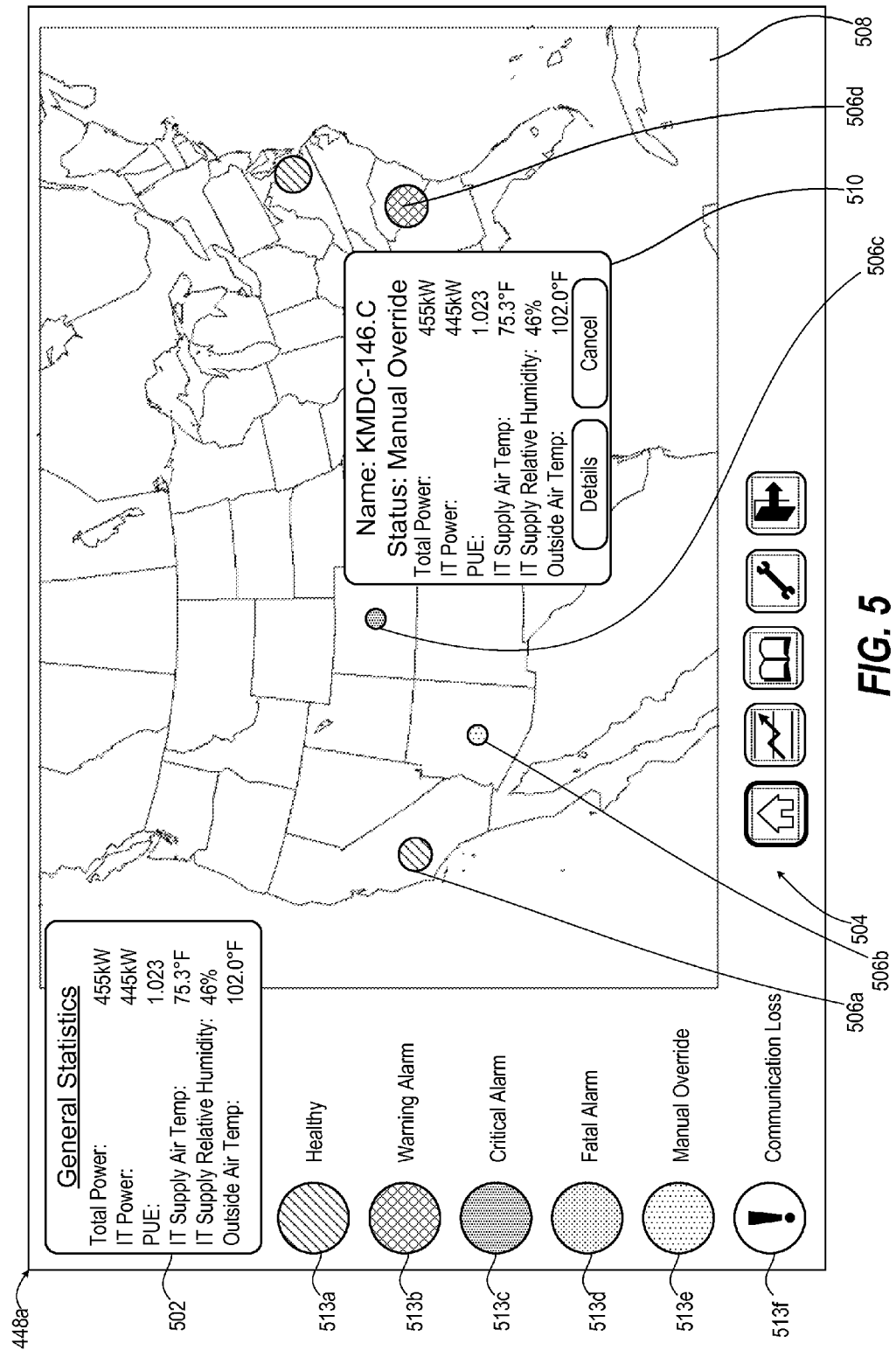
FIG. 5 illustrates an upper-level GUI with location annotations on a geographic map, according to one or more embodiments.
Figure 6:
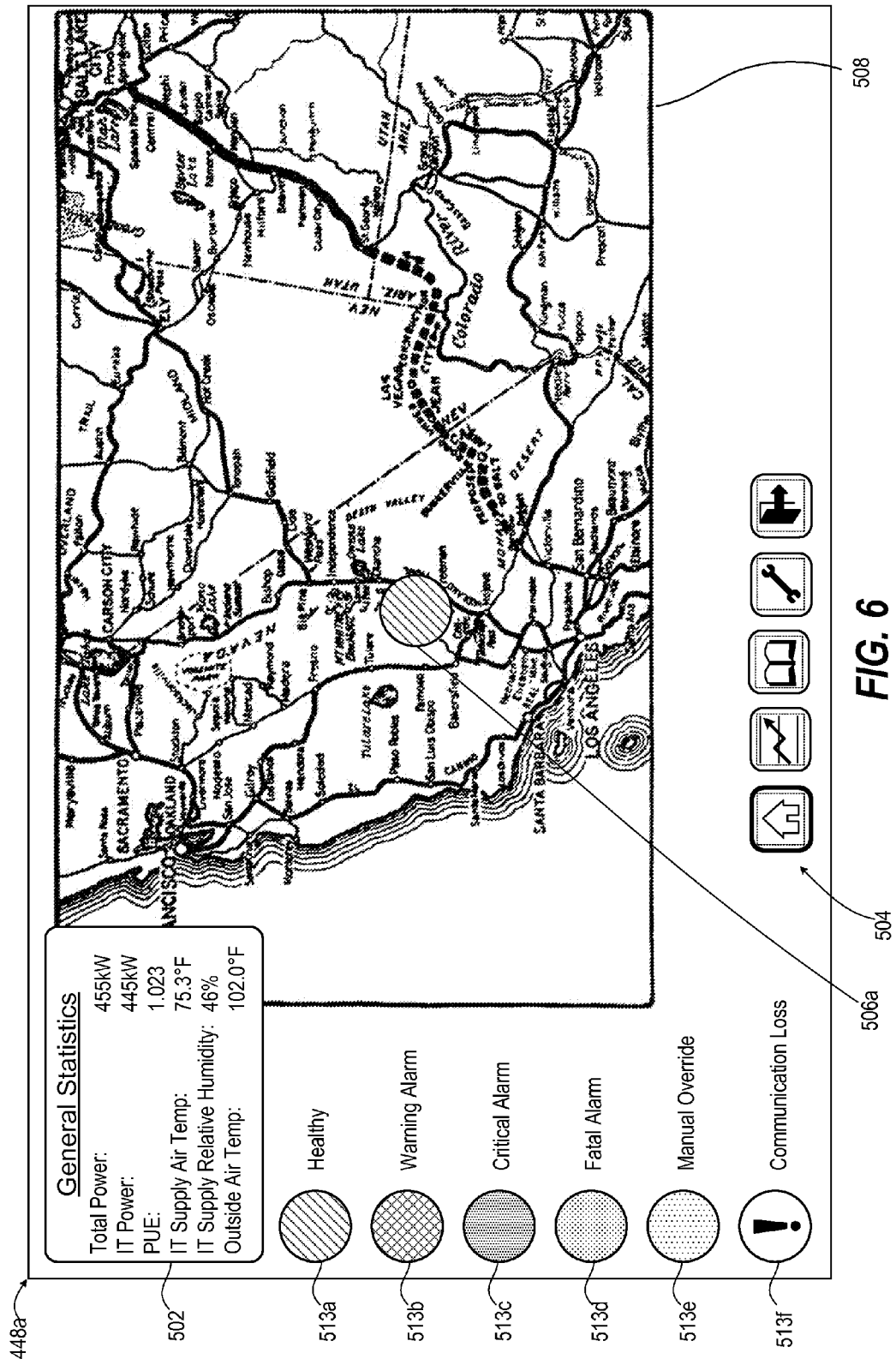
FIG. 6 illustrates the upper-level GUI of FIG. 5 with a change in the scale of the geographic map, according to one or more embodiments.

FIG. 5 illustrates the upper-level GUI 448a with high level statistic legend 502, control keys 504, and location annotations 506a-506d on a geographic map 508. This upper level GUI 448a can provide physical aspects of the city, highways, power infrastructures, with minimal details of each portion of the LIHS 400. The location annotations 506a-506d are colored or patterned according to their respective operating status as specified in color status indications 513a-513f respectively for healthy, warning alarm, critical alarm, fatal alarm, manual override, and communication loss. A location status legend 510 is selected to provide more information about the operating status. FIG. 6 illustrates the upper-level GUI 448a with a change in the scale of the map 508. The map 508 can be geographically accurate, drawn to equally space each location regardless of the actual distance between locations, or drawn with other orientations. In one or more embodiments, the LIHS 400 can be at a single location and thus obviating the need for a map 508.

Figure 7:
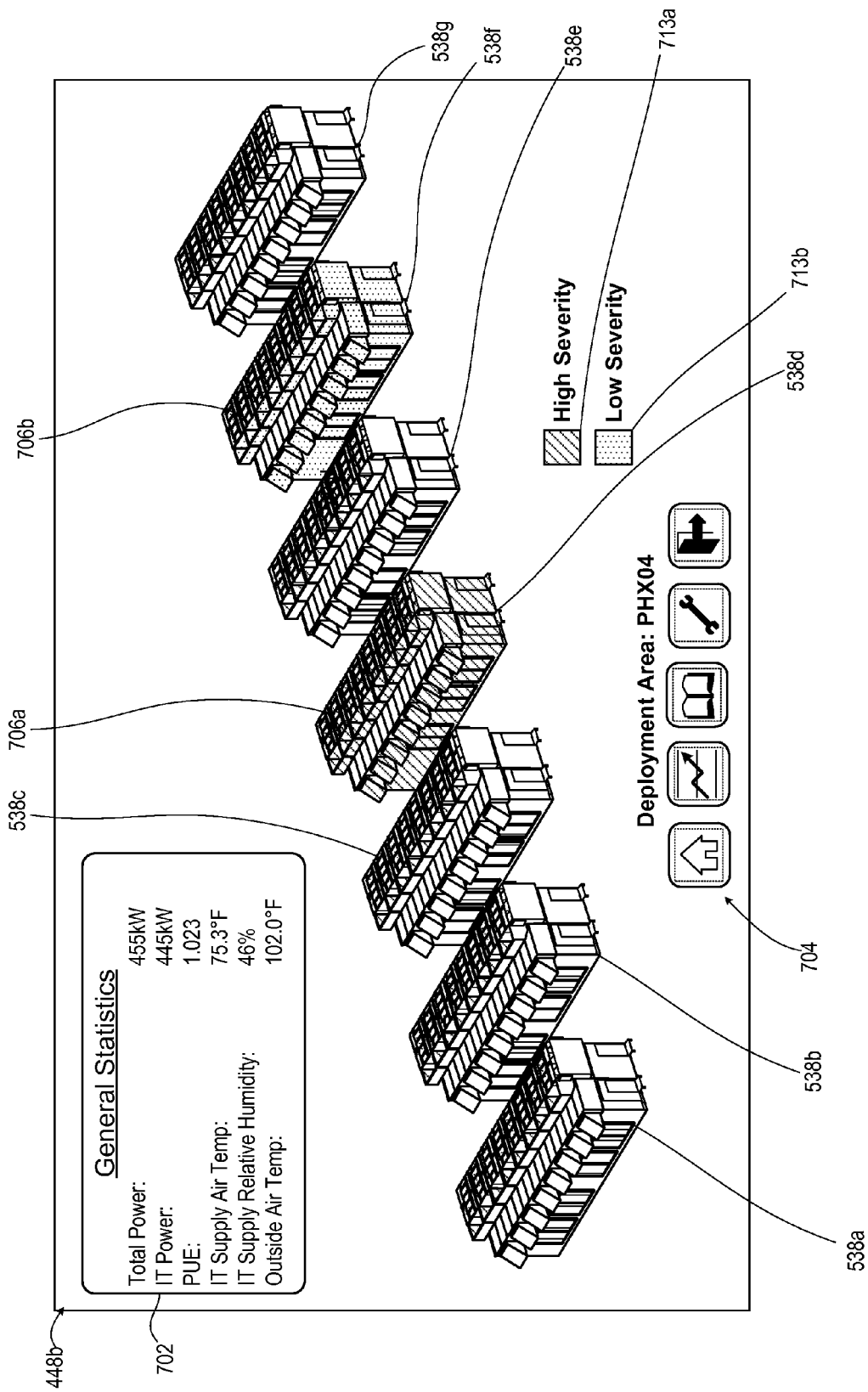
FIG. 7 illustrates a large-scale system level GUI with color or pattern overlays depicting operating or problem status, according to one or more embodiments.
Figure 8:
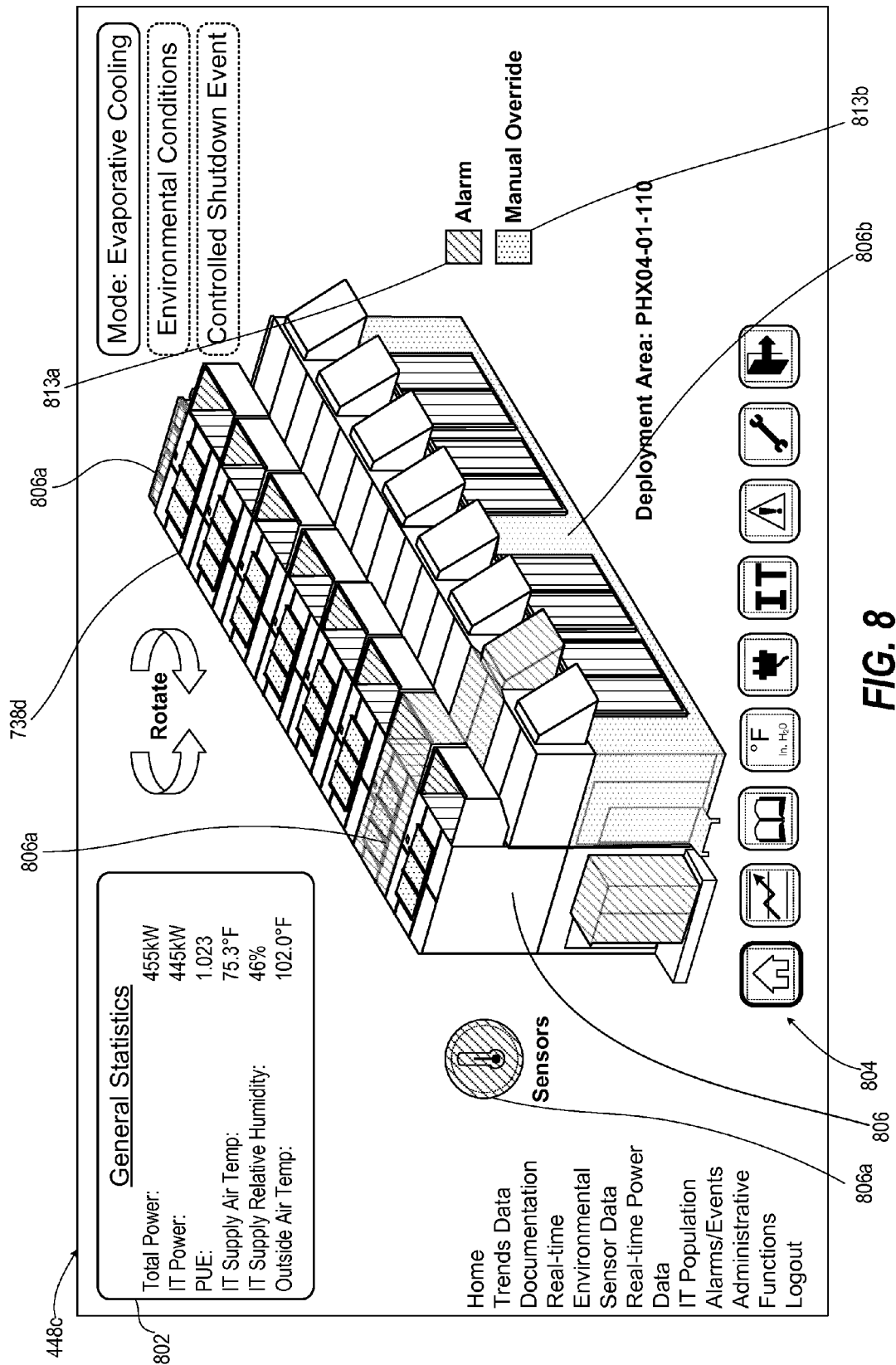
FIG. 8 illustrates a system level GUI with color or pattern overlays depicting operating or problem status, according to one or more embodiments.
Figure 9:
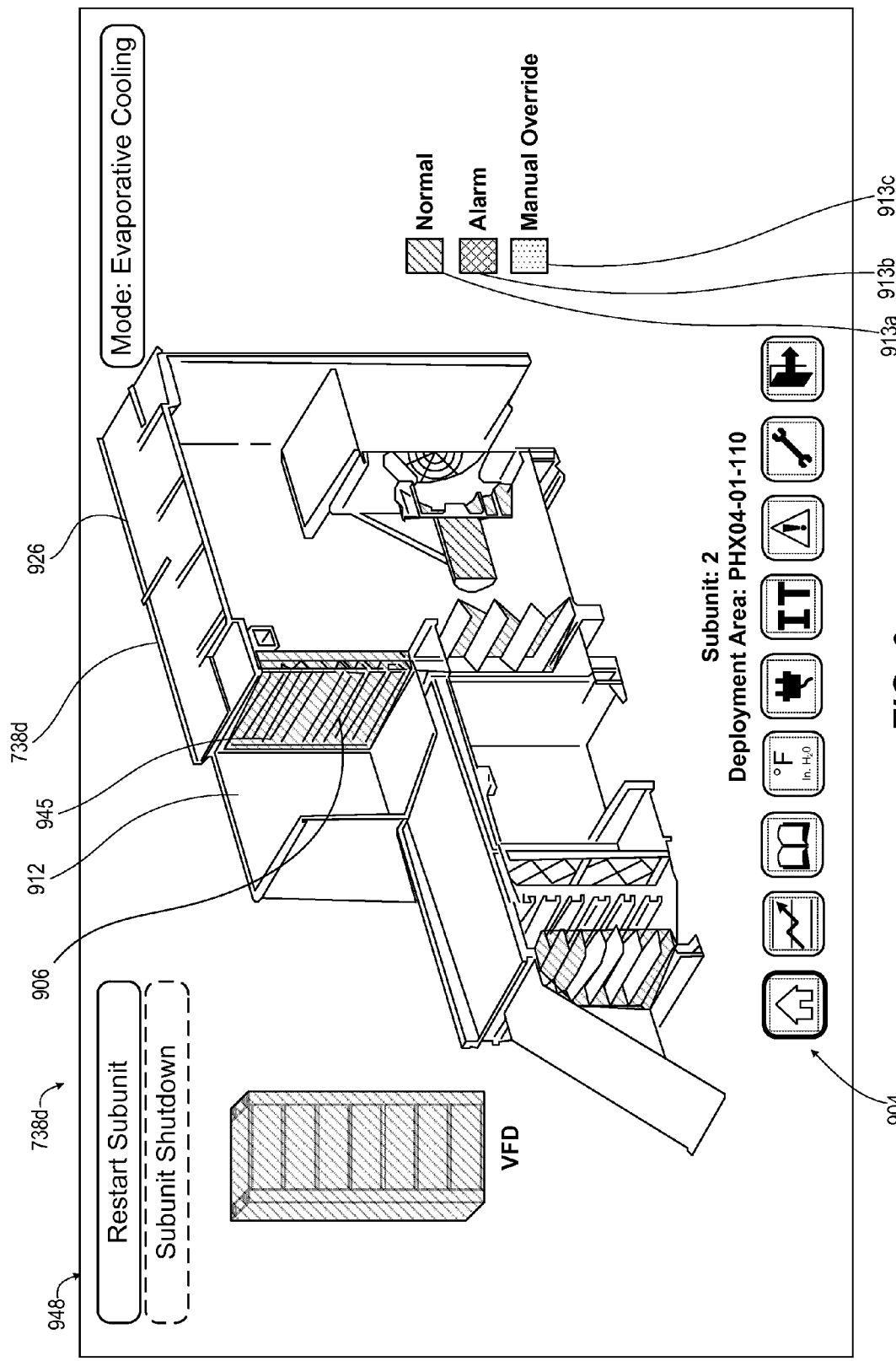
FIG. 9 illustrates a subsystem level GUI with color or pattern overlays for operating or problem status, according to one or more embodiments.
Figure 10:
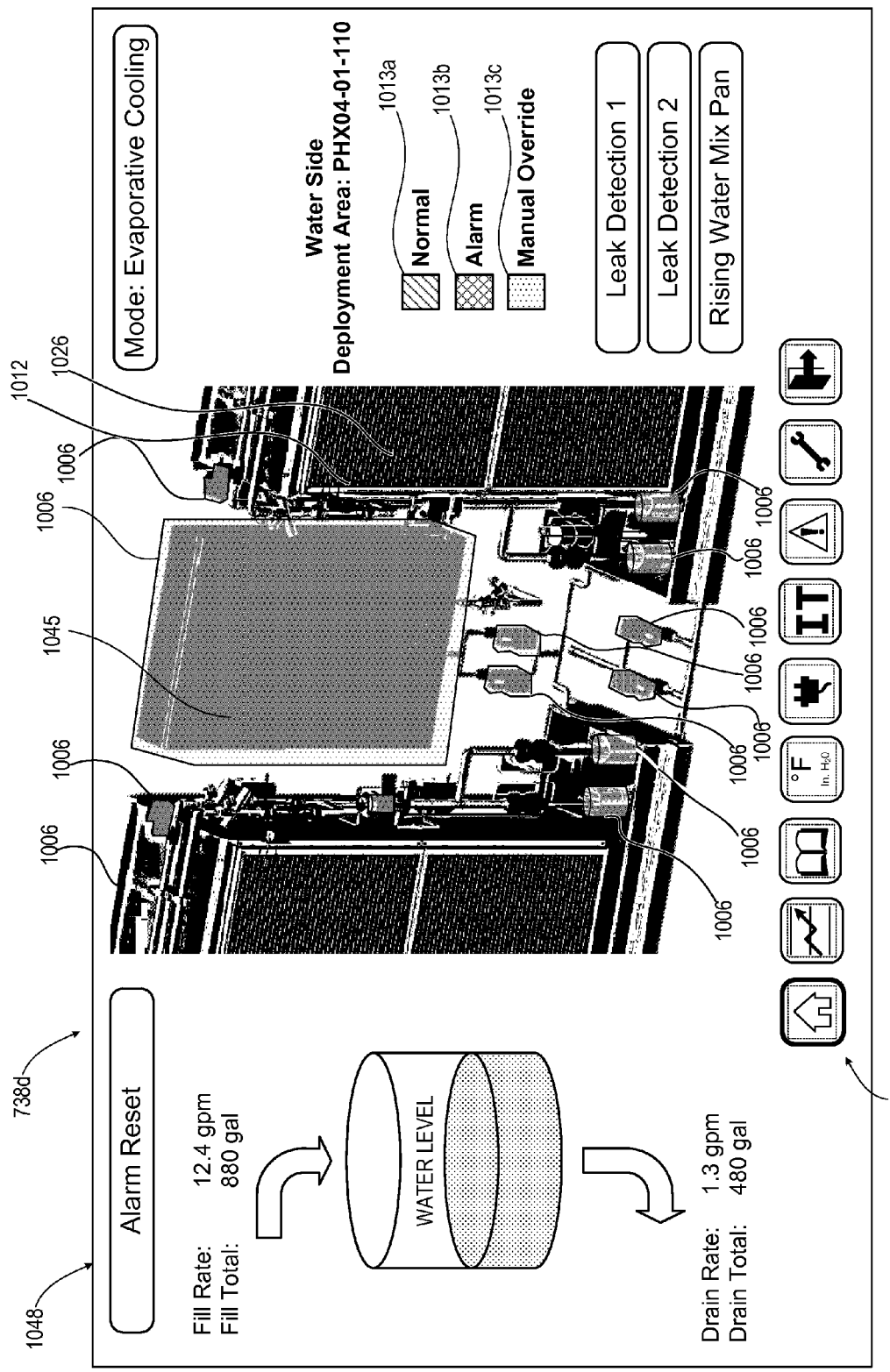
FIG. 10 illustrates an example component level GUI with color or pattern overlays depicting operating or problem status, according to one or more embodiments.
Figure 11:
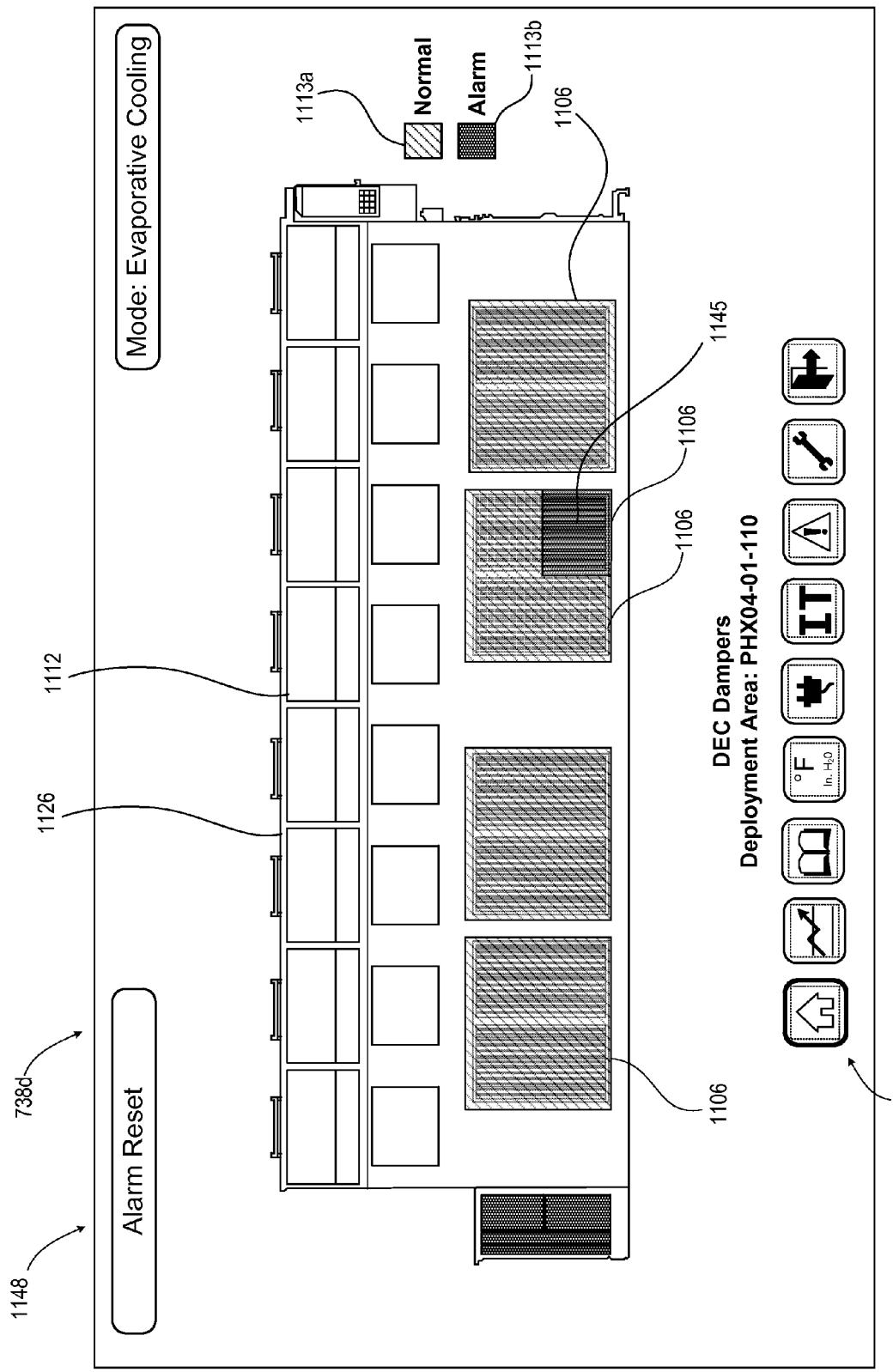
FIG. 11 illustrates an additional example subsystem level GUI with color or pattern overlays depicting operating or problem status, according to one or more embodiments.

FIG. 7 illustrates the large-scale system level GUI 448b with high level statistic legend 702, control keys 704, and MDCs 738a-738g. MDC 738d has a color or pattern overlay 713a for high severity and MDC 738f has a color or pattern overlay 713b for low severity. Within the described embodiments, severity can indicate a level of degradation of performance of particular portion of the LIHS 400. Alternatively or in conjunction, severity can indicate a level of urgency of performing repairs. Severity can also indicate a level of risk to damage to the LIHS 400. The level of severity can be identified with specific color coding at the particular location of the component that is experiencing or exhibiting a problem state (e.g., failure condition provides a red color overlay of the component location). FIG. 8 illustrates a system level GUI 448c with high level statistic legend 802, control keys 804, and a physical presentation 806 of the MDC 738d with color or pattern overlays for graphical status indications 806a for textual status indication 813a and color or pattern overlay 806b for an operating status of manual override 813b. FIG. 9 illustrates a subsystem level GUI 948 with control keys 904, and a physical presentation 926 of a subassembly 912 of MDC 738d with color or pattern overlays for graphical status indications 906 that are explained to correspond for an operating status for functional components 945 respectively of a normal status indication 913a, an alarm status indication 913b and a manual override status indication 913c. FIG. 10 illustrates an example component level GUI 1048 with control keys 1004, and a physical presentation 1026 of a subassembly 1012 of MDC 738d with color or pattern overlays 1006 respectively for an operating status for functional components 1045 respectively of a normal status indication 1013a, an alarm status indication 1013b and a manual override status indication 1013c. FIG. 11 illustrates a subsystem level GUI 1148 with control keys 1104, and a physical presentation 1126 of a subassembly 1112 of MDC 738d with color or pattern overlays 1106 respectively for an operating status for functional components 1145 respectively of normal 1113a and alarm 1113b.

Figure 12:
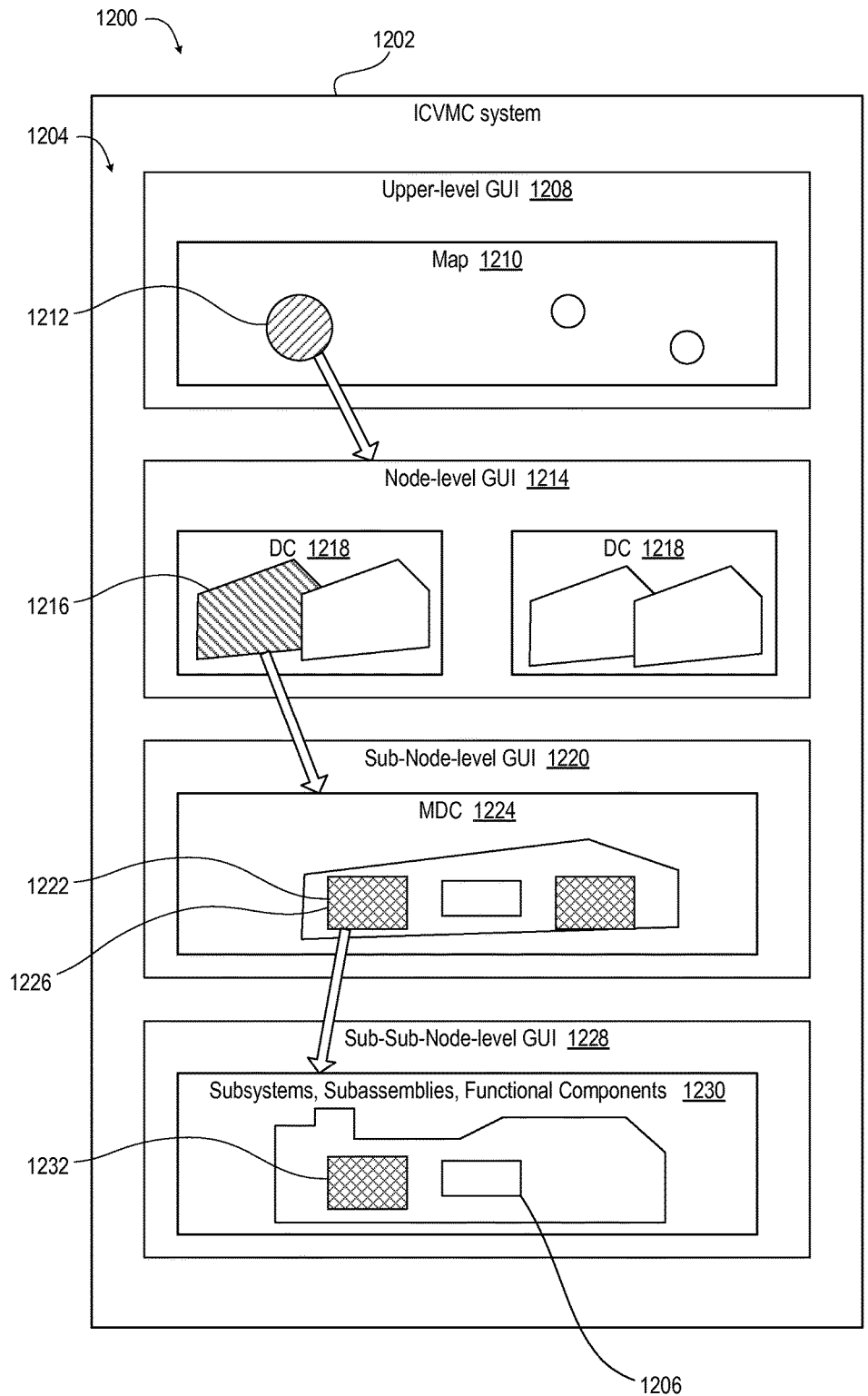
FIG. 12 illustrates a diagram of multi-tier GUIs depicting a failure indication, according to one or more embodiments.

FIG. 12 illustrates an LIHS 1200 having a ICVMC system 1202 that depicts multi-tier GUIs 1204 that enable a user to investigate degraded operating states and failures of functional components 1206. An upper level GUI 1208 can depict geographically displaced portions of the LIHS 1200 on a map 1210. One location indication 1212 can have color, pattern or size, etc. that alerts a user of a status that warrants further investigation. For example, a portion of the LIHS 1200 can indicate required maintenance although a severity can be relatively low due to sufficient redundancy at the location to handle the work load. Selecting the location indication 1212 within the upper level GUI 1208 can direct a user to a node-level GUI 1214 with a status indication 1216 for a particular data center 1218 that is operating at a degraded level due to a failure condition. The user can select the particular data center 1218 to further investigate the failure condition, which have selection links to a sub-node GUI 1220 that depicts a particular MDC 1224. Portions 1222 of the MDC 1224 can be annotated with a failure indication 1226. Further investigation can be facilitated by selecting a failed portion 1222 to interact with a lower Sub-Sub-Node level GUI 1228 such as depicting subsystems, subassemblies, functional components, 1230, etc., that have failure indication 1232. The severity of the indication at each level of the multi-tier GUIs 1204 can change with greater granularity of a portion of the LIHS 1200. At a top level, a particular failure may have no discernible impact to performance of the entire LIHS 1200. At the lowest levels of the multi-tier GUIs 1204 a failure can have the highest severity with regard to the operability of an affected subsystem or system.

Figure 13:
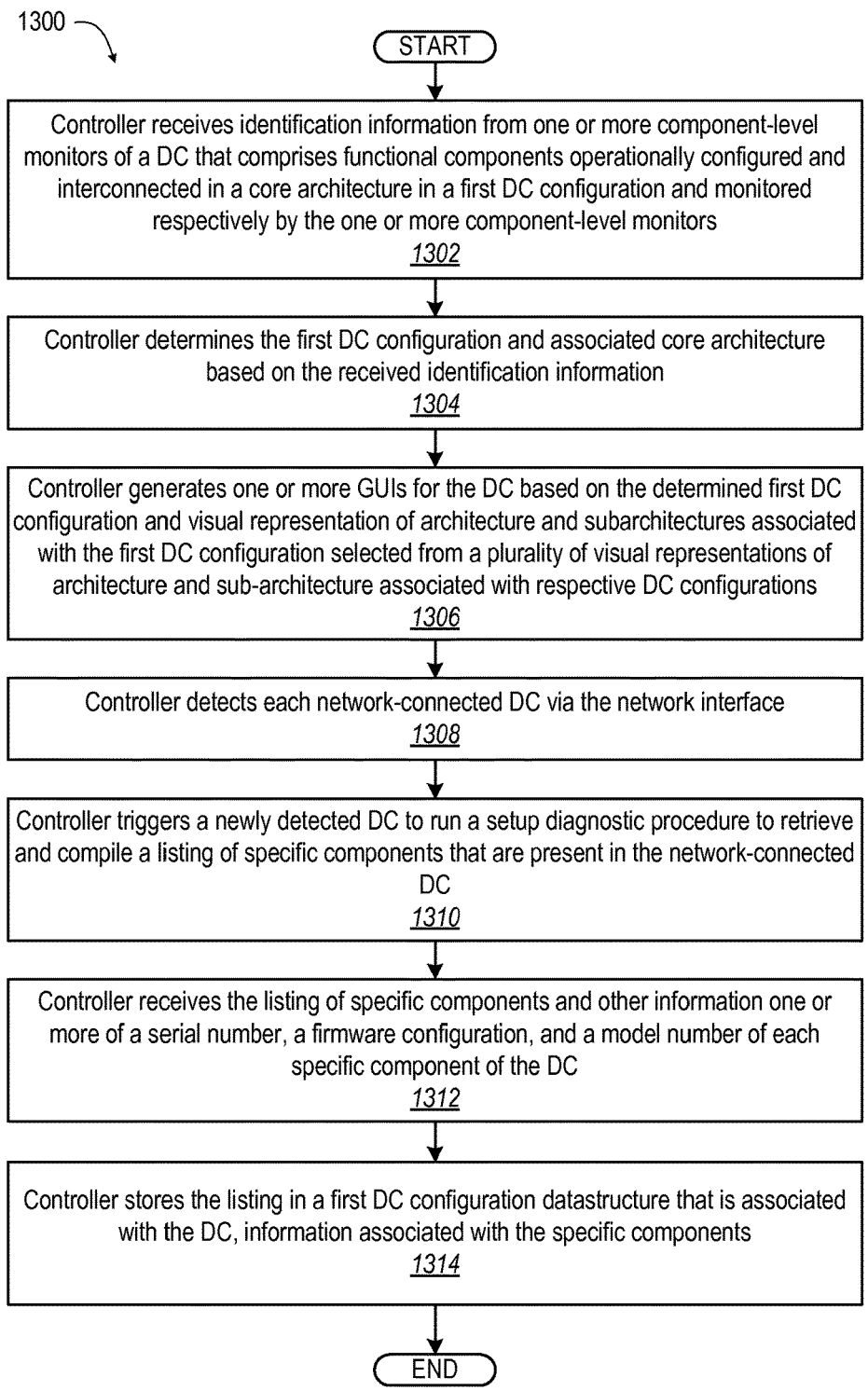
FIG. 13 illustrates a flow diagram of a method of interactive component-level visual monitoring and controlling an IHS, according to one or more embodiments.

FIG. 13 illustrates a method 1300 of interactively and visually monitoring and controlling an LIHS at a component level. In one or more embodiments, the method 1300 includes a controller receiving identification information from one or more component-level monitors of a DC that comprises functional components operationally configured and interconnected in a core architecture in a first DC configuration and monitored respectively by the one or more component-level monitors (block 1302). In one or more embodiments, the controller may communicate with the DC over a local network. The method 1300 includes the controller determining the first DC configuration and associated core architecture based on the received identification information (block 1304). The method 1300 includes the controller generating one or more GUIs for the DC based on the determined first DC configuration and visual representation of architecture and sub-architectures associated with the first DC configuration selected from a plurality of visual representations of architecture and sub-architecture associated with respective DC configurations (block 1306).

In one or more embodiments, the method 1300 includes the controller detecting each network-connected DC (nDC) via the network interface (block 1308). In response to detection of the nDC, the method 1300 can include the controller triggering the nDC to run a setup diagnostic procedure to retrieve and compile a listing of specific components that are present in the nDC (block 1310). The method 1300 includes the controller receiving the listing of specific components and other information associated with monitoring and control of the nDC (block 1312). The method 1300 includes the controller storing the listing in a first DC configuration data structure that is associated with the DC, information associated with the specific components and comprising one or more of a serial number, a firmware configuration, and a model number of each specific component (block 1314). Then method 1300 ends.

Figure 14:
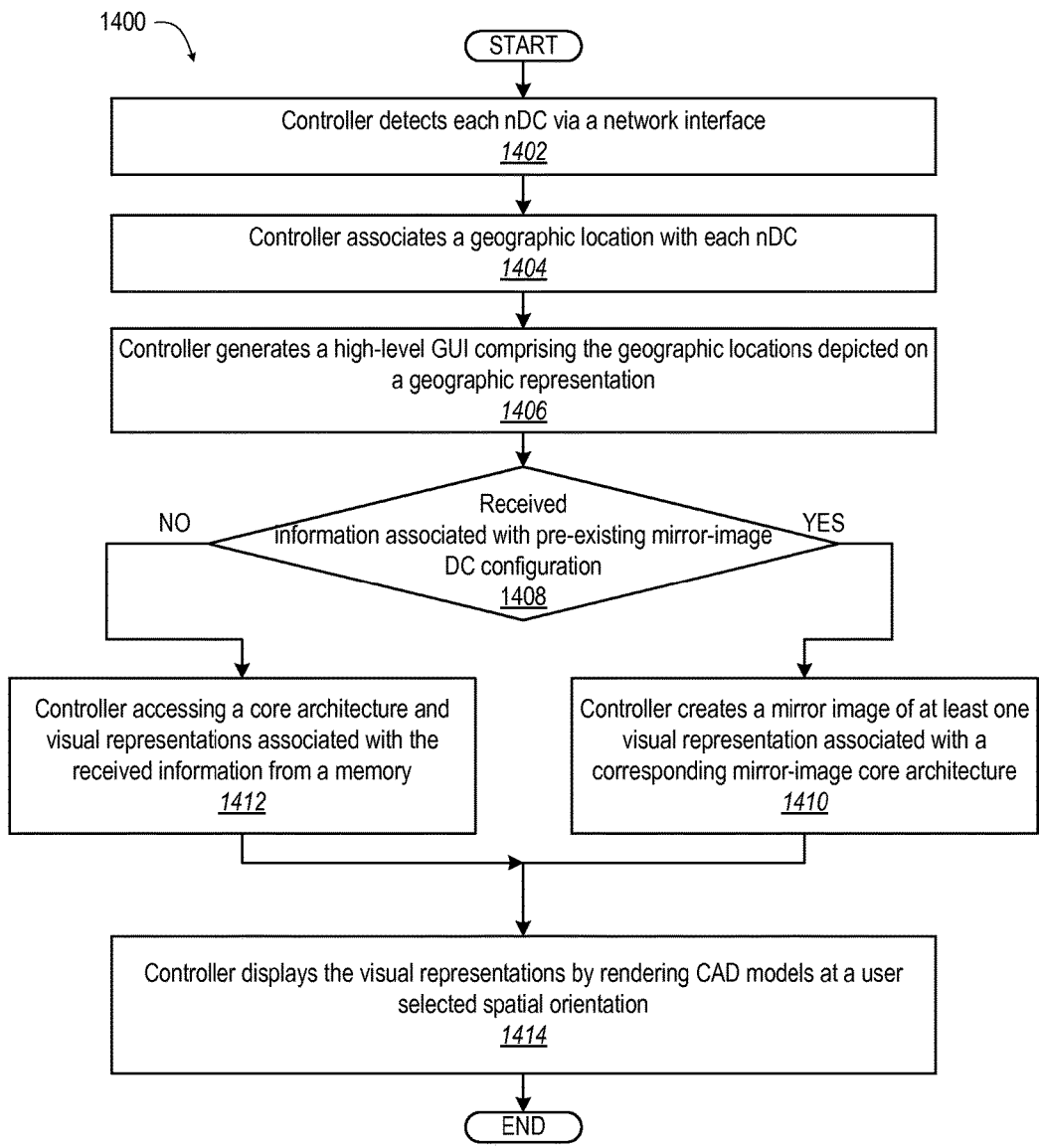
FIG. 14 illustrates a flow diagram of a method of generating the one or more GUIs for the DC, according to one or more embodiments.

FIG. 14 illustrates a method 1400 of generating the one or more GUIs for the DC. In one or more embodiments, the method 1400 includes the controller detecting each nDC via the network interface (block 1402). In response to detection of each nDC, the method 1400 includes the controller associating a geographic location with each nDC (block 1404). The method 1400 includes the controller generating a high-level GUI comprising the geographic locations depicted on a geographic representation (block 1406). The method 1400 includes the controller determining whether the received identification information is associated with a pre-existing mirror-image DC configuration (decision block 1408). In response to determining that the received identification information is associated with a pre-existing mirror-image DC configuration, the method 1400 includes the controller creating a mirror-image of at least one visual representation associated with corresponding mirror-image core architecture (block 1410). In response to determining that the received identification information is not associated with a pre-existing mirror-image DC configuration, the method 1400 includes the controller accessing a core architecture and visual representations associated with the received information from a memory (block 1412). After either block 1410 or block 1412, the method 1400 includes the controller displaying the visual representations by rendering CAD models at a user selected spatial orientation (block 1414). Then method 1400 ends.

In the above described flow charts of FIGS. 13 and 14, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood, by those skilled in the art, that various changes may be made and equivalents may be substituted for elements thereof without departing from the scope of the disclosure. In addition, many modifications may be made to adapt a particular system, device or component thereof and to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A large-scale information handling system (LIHS) comprising:
 a data center (DC) that comprises functional components operationally configured and interconnected in a core architecture in a first DC configuration and comprises one or more component-level monitors that monitor respective functional components;
 a memory containing visual representations of architecture and sub-architecture associated with respective DC configurations;
 a display device;
 a processor in communication with the component level monitors, the display device, and the memory; and
 an interactive component-level visual monitoring and control (ICVMC) system comprising an ICVMC module executing on the processor and which enables the processor to:
  receive identification information from the one or more component-level monitors of the DC;
  determine the first DC configuration and identify associated core architecture based on the received identification information;
  generate one or more graphical user interfaces (GUIs) for the DC based on the determined first DC configuration and the visual representation of architecture and sub-architectures associated with the first DC configuration, and
  display, via the display device, at least one of the one or more GUIs providing the visual representation of the architecture and sub-architecture associated with the first DC configuration;
 wherein the visual representations of architecture and sub-architecture associated with respective DC configurations including a mirror-image core architecture to the first DC configuration; and
 the ICVMC system generates, via the processor, the one or more GUIs for the DC by configuring the processor to:
  determine that received identification information is associated with a pre-existing mirror-image DC configuration; and
  in response to determining that the received identification information is associated with a pre-existing mirror-image DC configuration create a mirror-image of at least one visual representation associated with a corresponding mirror-image core architecture.

2. The LIHS of claim 1, wherein the data center comprises a network interface and the ICVMC system:
 detects, via the network interface, each network-connected DC (nDC);
 in response to detection of the nDC, generates and issues a signal that triggers the nDC to run a setup diagnostic procedure to retrieve and compile a listing of specific components that are present in the nDC; and
 receive the listing of specific components and other information associated with monitoring and control of the nDC.

3. The LIHS of claim 1, wherein the ICVMC system: receives a listing of specific components of the DC from the one or more component-level monitors; and incorporates information associated with the specific components in a first DC configuration data structure that is associated with the DC.

4. The LIHS of claim 3, wherein the information incorporated in the first DC configuration data structure comprises one or more of a serial number, a firmware configuration, and a model number of each specific component in the listing.

5. The LIHS of claim 1, wherein the ICVMC system:
 detects, via the network interface, each network-connected DC (nDC);
 in response to detection of each nDC, associates a geographic location with each nDC; and
 generates a high-level GUI comprising the geographic locations depicted on a geographic representation; and
 displays the high-level GUI with the geographic locations of each nDC in response to receipt of a selection of a geographic representation GUI.

6. The LIHS of claim 1, wherein:
 the visual representations comprise three-dimensional computer aided design (CAD) models; and
 the ICVMC system displays the visual representations by rendering the CAD models at a user selected spatial orientation.

7. An interactive component-level visual monitoring and control (ICVMC) system of a large-scale information handling system (LIHS), the system comprising:
 one or more component-level monitors that monitor respective functional components within data centers of the LIHS;
 a memory containing visual representations of architecture and sub-architecture associated with respective data center (DC) configurations, including a mirror-image core architecture to a first DC configuration; and;
 a processor in communication with the one or more component level monitors and the memory; and
 an ICVMC module executing on the processor causing the processor to:
  receive identification information from the one or more component-level monitors of a DC, the DC comprising functional components operationally configured and interconnected in a core architecture in the first DC configuration and monitored respectively by the one or more component-level monitors;
  determine the first DC configuration and associated core architecture based on the received identification information;
  generate one or more graphical user interfaces (GUIs) for the DC based on the determined first DC configuration and the visual representation of architecture and sub-architectures associated with the first DC configuration; and
  display, via the display device, at least one of the one or more GUIs providing the visual representation of the architecture and sub-architecture associated with the first DC configuration;
 wherein the ICVMC module causes the processor to generate the one or more GUIs for the DC by configuring the processor to:
  determine that received identification information is associated with a pre-existing mirror-image DC configuration; and
  in response to determining that the received identification information is associated with a pre-existing mirror-image DC configuration create a mirror-image of at least one visual representation associated with a corresponding mirror-image core architecture.

8. The ICVMC system of claim 7, wherein the ICVMC system:
   detects, via a network interface, each network-connected DC (nDC);
   in response to detection of the nDC, generates and issues a signal that triggers the nDC to run a setup diagnostic procedure to retrieve and compile a listing of specific components that are present in the nDC; and
   receives the listing of specific components and other information associated with monitoring and control of the nDC.

9. The ICVMC system of claim 7, wherein the ICVMC module:
   receives a listing of specific components of the DC from the one or more component-level monitors; and
   incorporates information associated with the specific components in a first DC configuration data structure that is associated with the DC.

10. The ICVMC system of claim 9, wherein the information incorporated in the first DC configuration data structure comprises one or more of a serial number, a firmware configuration, and a model number of each specific component in the listing.

11. The ICVMC system of claim 7, wherein the ICVMC module:
   detects, via the network interface, each network-connected DC (nDC);
   in response to detection of each nDC, associates a geographic location with each nDC; and
   generates a high-level GUI comprising the geographic locations depicted on a geographic representation.

12. The ICVMC system of claim 7, wherein:
   the visual representations comprise three-dimensional computer aided design (CAD) models; and
   the ICVMC module displays the visual representations by rendering the CAD models at a user selected spatial orientation.

13. A method of interactively and visually monitoring and controlling a large-scale information handling system (LIHS) at a component level, the method comprising:
   receiving, at a processor of an information handling system (IHS), identification information from one or more component-level monitors of a data center (DC), the DC comprising functional components operationally configured and interconnected in a core architecture in a first DC configuration and monitored respectively by the one or more component-level monitors;
   determining, via the processor, the first DC configuration and associated core architecture based on the received identification information;
   generating, via the processor, one or more graphical user interfaces (GUIs) for the DC, based on the determined first DC configuration and visual representation of architecture and sub-architectures associated with the first DC configuration selected from a plurality of visual representations of architecture and sub-architecture associated with respective DC configurations;
   displaying, via a display device, at least one of the one or more GUIs providing the visual representation of the architecture and sub-architecture associated with the first DC configuration;
   determining, by the processor, that received identification information is associated with a pre-existing mirror-image DC configuration; and
   in response to determining that the received identification information is associated with a pre-existing mirror-image DC configuration, creating a mirror-image of at least one visual representation associated with a corresponding mirror-image core architecture.

14. The method of claim 13, further comprising:
   detecting, via the network interface, each network-connected DC (nDC);
   in response to detection of the nDC, triggering the nDC to run a setup diagnostic procedure to retrieve and compile a listing of specific components that are present in the nDC and to return the listing to the requesting system; and
   receiving the listing of specific components and other information associated with monitoring and control of the nDC.

15. The method of claim 13, further comprising:
   receiving a listing of specific components of the DC from the one or more component-level monitors; and
   incorporating, in a listing in a first DC configuration data structure that is associated with the DC, information associated with the specific components and comprising one or more of a serial number, a firmware configuration, and a model number of each specific component.

16. The method of claim 13, further comprising:
   detecting each network-connected DC (nDC) via the network interface;
   in response to detection of each nDC, associating a geographic location with each nDC; and
   generating a high-level GUI comprising the geographic locations depicted on a geographic representation.

17. The method of claim 13, wherein:
   the visual representations comprise three-dimensional computer aided design (CAD) models; and
   displaying the visual representations comprises rendering the CAD models at a user selected spatial orientation.

* * * * *